United States Patent [19]

Naito

[11] Patent Number: 5,846,431

[45] Date of Patent: Dec. 8, 1998

[54] METHOD FOR REMOVING DYESTUFF IN DYEING WASTE AND A DYEING STUFF REMOVING PREPARATION

[76] Inventor: Harusuke Naito, c/o Kabushiki Kaisha N.B.L. 1-3, Tamachi 2-chome, Okayama-shi, Okayama-ken, Japan

[21] Appl. No.: 878,214

[22] Filed: Jun. 18, 1997

[30] Foreign Application Priority Data

Jun. 27, 1996 [JP] Japan ..................... 8-186723

[51] Int. Cl.⁶ ..................................... B01J 20/12
[52] U.S. Cl. .......................... 210/691; 210/694; 502/410; 502/413
[58] Field of Search .................. 502/406, 407, 502/410, 413; 210/691, 694

[56] References Cited

U.S. PATENT DOCUMENTS 5,611,853   3/1997   Morimoto ............................. 210/500.1

Primary Examiner—Gary P. Straub
Assistant Examiner—Stuart L. Hendrickson
Attorney, Agent, or Firm—Hedman, Gibson & Costigan, P.C.

[57] ABSTRACT

A preparation for removing dyestuff in dyeing waste water includes a carbonized carbonaceous material and powdery or granular bakuhanseki deposited on the surface of the carbonized carbonaceous material. In one aspect of the invention, a preparation for removing dyestuff in dyeing waste water includes a carbonized carbonaceous material and at least one compound selected from the group consisting of silicic acid anhydride, aluminum oxide, magnesium oxide, potassium oxide, sodium oxide, calcium oxide, ferrous oxide, ferric oxide, titanium oxide, phosphorous pentaoxide and manganese oxide, said compound being deposited on the surface of the carbonized carbonaceous material. There is also provided a method for removing dyestuff in dyeing waste water by adding these dyestuff removing preparations.

2 Claims, 2 Drawing Sheets

METHOD FOR REMOVING DYESTUFF IN DYEING WASTE AND A DYEING STUFF REMOVING PREPARATION

BACKGROUND OF THE INVENTION

This invention relates to a method for removing dyestuff in dyeing waste water flowing out of a drainage of a dyeing machine used, e.g., in a textile or paper industry. The invention relates also to a preparation for removing dyestuff used in this method.

In the textile and paper industries, there has been no effective and economic method for removing dyestuff in dyeing waste water flowing out of a drainage of a dyeing machine. Currently, dyeing waste water is diluted with water to the degree at which concentration of dyestuff contained in the waste water is reduced to a statutorily allowable level and then is discharged to sewage or a river. For this reason, a large amount of diluting water is required for diluting dyeing waste water.

It is, therefore, an object of the present invention to effectively remove dyestuff in dyeing waste water by a simple and economic method and thereby eliminate necessity for a large amount of diluting water.

SUMMARY OF THE INVENTION

As a result of studies and experiments, the inventor has found, which has led to the present invention, that when a carbonized carbonaceous material such as charcoal on the surface of which is deposited powdery or granular bakuhanseki is added to dyeing waste water, dyestuff in the dyeing waste water is surprizingly adsorbed by this material substantially completely within a relatively short period of time and the concentration of dyestuff in the dyeing waste water is reduced below the statutorily allowable level.

A preparation for removing dyestuff in dyeing waste water according to the invention comprises a carbonized carbonaceous material and powdery or granular bakuhanseki deposited on the surface of the carbonized carbonaceous material.

In the present specification and claims, the term "carbonaceous material" is used to designate a fibrous or porous material containing carbon as a principal ingredient and includes plant fibrous materials such as wood, sawdust, coconut husk, pulp waste fluid, rice husk, coffee bean draff and soya bean draff and activated carbon made of a fossil fuel material such as coal and a plastic waste.

The carbonaceous material used in the invention is carbonized and charcoal is a typical carbonized carbonaceous material. The carbonized carbonaceous material may be converted to activated carbon by, e.g., acting water vapor to the carbonized carbonaceous material in the known manner. The carbonized carbonaceous material should preferably be used in the form of either chips, grains, powder or fibers.

It is another important feature of the present invention to use bakuhanseki in the form in which bakuhanseki is deposited on the surface of a carbonized carbonaceous material. "Bakuhanseki" is a Japanese word and there is no English word or authenticated mineralogical name for it. The Chinese word for it is "maifanshih". In the specification and claims of the present application, the term "bakuhanseki" is used to designate a stone which belongs to quartz porphyry which is a kind of igneous rock, includes as its principal ingredients alkali feldspar and high temperature quartz (i.e., quartz which is crystallized at a temperature between 573° C. and 870° C.), is very porous, contains a multiplicity of elements and compounds, radiates only a very small amount of alpha ray but substantially no beta or gamma ray, has a part of the alkali feldspar ingredient changed to calcite ($CaCO_3$) due to naturally occurring carbonization, and has an appearance of white phenocryst of alkali feldspar and grey crystals of quartz being scattered as if by inlaying in a pale brown or pale grey groundmass.

Bakuhanseki is produced in some limited mountain areas in Japan and China and there has been no report that this stone has been found in other country in the world. According to an analysis made by a Japanese sceientist, a bakuhanseki specimen produced in Kamo County, Gifu Prefecture in Japan contains, as its principal ingredients, about 70% silicon dioxide ($SiO_2$) and about 14% aluminum oxide ($Al_2O_3$) and, as other ingredients, magnesium oxide (MgO), potassium oxide ($K_2O$), sodium oxide ($Na_2O$), calcium oxide (CaO), ferrous oxide (FeO), ferric oxide ($Fe_2O_3$), titanium oxide ($TiO_2$), phosphorous pentaoxide ($P_2O_5$) and manganese oxide (MnO).

Bakuhanseki is known to discharge minerals such as iron and magnesium into water when these minerals in water are in shortage and it is also known to adsorb, owing to its porosity, residual chlorine, poisonous heavy metals such as cadmium and mercury, organic matters and bacteria in water and thereby remove these materials from water. However, there has been no experiment in which bakuhanseki was used to adsorb dyestuff in dyeing waste water. Neither has there been any proposal to utilize bakuhanseki for such purpose. Further, as will be described later, it has been found that the effect of bakuhanseki as a dyestuff remover is not an additive effect of the adsorbing function of a carbonized carbonaceous material such as charcoal and the adsorbing function of bakuhanseki but a synergistic effect exceeding such additive effect.

Bakuhanseki used may be either in a powdery state or in a granular state. Bakuhanseki in a powdery state is preferable to bakuhanseki in a granular state because bakuhanseki in a powdery state has an equivalent effect with a smaller amount than bakuhanseki in a granular state. Bakuhanseki in a powdery state is also preferable because it is superior to bakuhanseki in a granular state in adhesion to a carbonized carbonaceous material. An optimum ratio of the amount of bakuhanseki to the amount of a carbonized carbonaceous material can be determined depending upon dyestuff removing conditions such as the type and concentration of dyestuff in dyeing waste water.

The dyestuff removing preparation according to the invention can be reused by drying after use of it for a certain period of time. As carbonaceous materials, various materials such as waste lumber and sawdust which are usually abandoned as industrial waste can be utilized. For these reasons, the dyestuff removing preparation is very economical.

The mechanism producing such synergistic effect by depositing powdery or granular bakuhanseki on the surface of a carbonized carbonaceous material is quite unknown. Since the chemical composition of bakuhanseki is silicic acid anhydride, aluminum oxide, magnesium oxide, potassium oxide, sodium oxide, calcium oxide, ferrous oxide, ferric oxide, titanium oxide, phosphorous pentaoxide and manganese oxide, it is conceivable that an ion of at least one compound in the composition deposited on the carbonized carbonaceous material combines with a pairing ion of dyestuff contained in dyeing waste water and thereby enhances the effect of adsorbing and removing dyestuff in the dyeing waste water. Therefore, the dyestuff adsorbing effect is considered to be performed by deposition of at least one of these compounds on the carbonized carbonaceous material.

Accordingly, according to one aspect of the invention, there is provided a preparation for removing dyestuff in dyeing waste water comprising a carbonized carbonaceous material and at least one compound selected from the group consisting of silicic acid anhydride, aluminum oxide, magnesium oxide, potassium oxide, sodium oxide, calcium oxide, ferrous oxide, ferric oxide, titanium oxide, phosphorous pentaoxide and manganese oxide, said compound being deposited on the surface of the carbonized carbonaceous material.

In another aspect of the invention, there is provided a method for removing dyestuff in dyeing waste water by adding the above described dyestuff removing preparation.

For adding the dyestuff removing preparation to the dyeing waste water, a plurality of columns each containing the dyestuff removing preparation may be connected in series so that each column is communicated with adjacent columns and dyeing waste water to be treated may be passed through these columns. Alternatively, dyeing waste water may be filled in a container containing the dyestuff removing preparation and allowed to contact the dyestuff removing preparation for a predetermined period of time before being discharged. Various other ways for adding the dyestuff removing preparation in dyeing waste water can be employed. Conditions of using the dyestuff removing preparation such as the amount of use and contact time of the dyestuff removing preparation with dyeing waste water may be determined depending upon conditions of the dyestuff in the dyeing waste water such as the type and concentration of the dyestuff.

Preferred embodiment of the invention will be described below with reference to the accompanying drawings.

BRIEF DESCRIPTION OF THE DRAWINGS

In the accompanying drawings.

DESCRIPTION OF PREFERRED EMBODIMENTS

Referring to the accompanying drawings, an example of the present invention and comparative examples will now be described.

Example (1) Preparation of a Dyestuff Remover

Wood (cedar) 1,000 g was crushed into small chips having a length of 1 mm to 2 mm. Granular bakuhanseki produced by Kabushiki Kaisha Nishio was crushed into powdery bakuhanseki of 7 mesh to 9 mesh. The powdery bakuhanseki of 100 g was mixed with a small amount of water and deposited on the surface of the chips of wood.

The wood chips on which the powdery bakuhanseki was deposited were carbonized at the temperature of about 500° C. for about one hour in a rotary kiln. After quenching and cooling, 800 g of a black dyestuff removing preparation consisting of the wood chips deposited with the powdery bakuhanseki was obtained. Since the weight of bakuhanseki remained unchanged during the carbonization process, this dyestuff removing preparation consisted of 700 g of carbon (87.5%) and 100 g of bakuhanseki (12.5%).

(2) Removal of Dyestuff in Dyeing Waste Water

Figure 1:
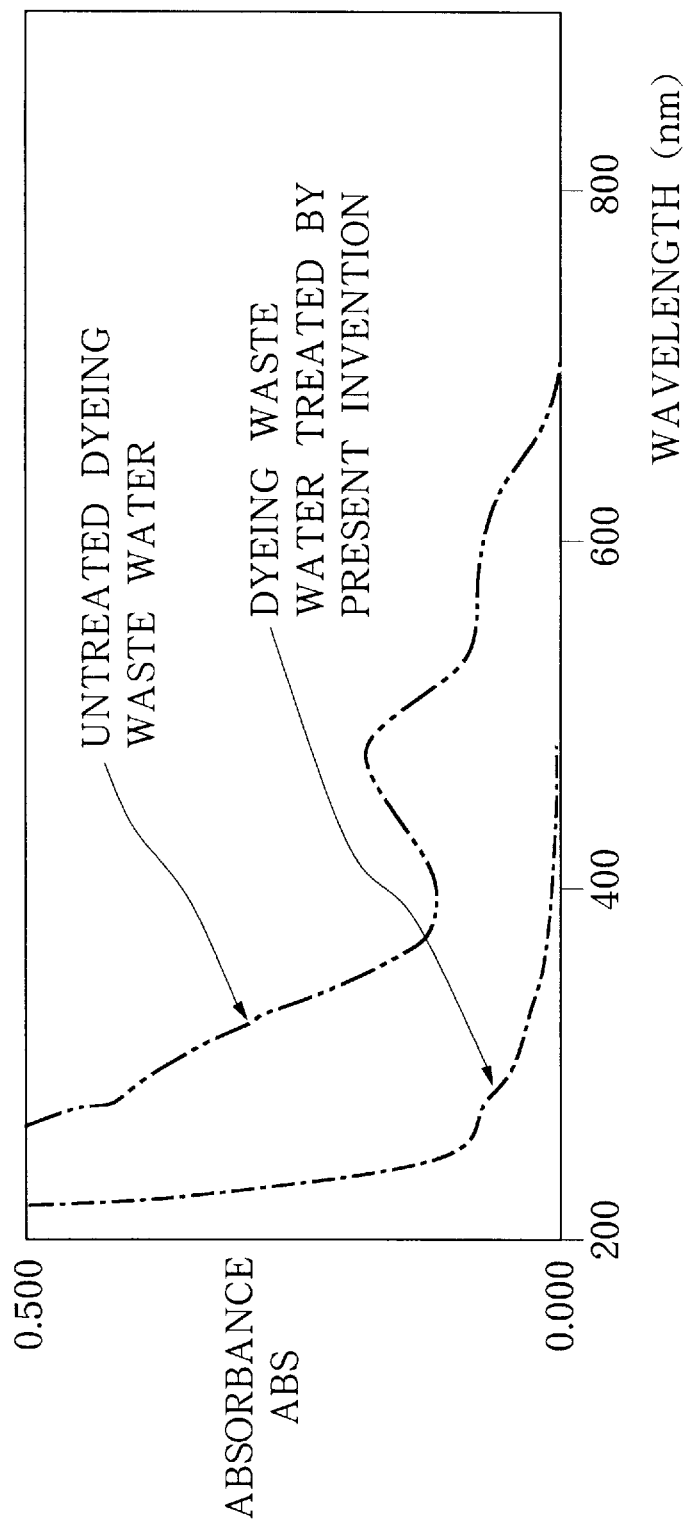
FIG. 1 is a graph showing results of measuring absorbance of waste water before and after adding the dyestuff removing preparation according to the invention.

The above described dyestuff removing preparation was added to dyeing waste water flowing out of an outlet of a textile dyeing factory to confirm the dyestuff removing effect of the preparation. Before treatment, this dyeing waste water exhibited a brown color and contained 132 types of dyestuff including anionic dyestuffs, cationic dyestuffs and mineral dyestuffs. Results of absorbance measurement by a spectrophotometer indicated that, as shown in Table 1 and FIG. 1, these dyestuffs existed concentrically in the vicinity of wavelength of 470 nm (absorbance at 470 nm was 0.184).

TABLE 1

| Absorbance analysis of untreated dyeing waste water | | | |
|---|---|---|---|
| wavelength nm | absorbance ABS | wavelength nm | absorbance ABS |
| 900.0 | 0.000 | 550.0 | 0.083 |
| 890.0 | 0.000 | 540.0 | 0.086 |
| 880.0 | 0.000 | 530.0 | 0.094 |
| 870.0 | 0.000 | 520.0 | 0.110 |
| 860.0 | 0.000 | 510.0 | 0.131 |
| 850.0 | 0.000 | 500.0 | 0.154 |
| 840.0 | 0.000 | 490.0 | 0.171 |
| 830.0 | 0.000 | 480.0 | 0.182 |
| 820.0 | 0.000 | 470.0 | 0.184 |
| 810.0 | 0.000 | 460.0 | 0.178 |
| 800.0 | 0.000 | 450.0 | 0.167 |
| 790.0 | 0.000 | 440.0 | 0.154 |
| 780.0 | 0.001 | 430.0 | 0.140 |
| 770.0 | 0.001 | 420.0 | 0.130 |
| 760.0 | 0.001 | 410.0 | 0.124 |
| 750.0 | 0.001 | 400.0 | 0.121 |
| 740.0 | 0.001 | 390.0 | 0.119 |
| 730.0 | 0.002 | 380.0 | 0.117 |
| 720.0 | 0.002 | 370.0 | 0.123 |
| 710.0 | 0.003 | 360.0 | 0.142 |
| 700.0 | 0.004 | 350.0 | 0.177 |
| 690.0 | 0.006 | 340.0 | 0.222 |
| 680.0 | 0.010 | 330.0 | 0.265 |
| 670.0 | 0.014 | 320.0 | 0.294 |
| 660.0 | 0.022 | 310.0 | 0.321 |
| 650.0 | 0.031 | 300.0 | 0.354 |
| 640.0 | 0.042 | 290.0 | 0.379 |
| 630.0 | 0.052 | 280.0 | 0.401 |
| 620.0 | 0.062 | 270.0 | 0.427 |
| 610.0 | 0.068 | 260.0 | 0.471 |
| 600.0 | 0.073 | 250.0 | 0.530 |
| 590.0 | 0.077 | 240.0 | 0.654 |
| 580.0 | 0.080 | 230.0 | 0.926 |
| 570.0 | 0.081 | 220.0 | 1.154 |
| 560.0 | 0.082 | 210.0 | 1.367 |
|  |  | 200.0 | 1.650 |

500 ml of this dyeing waste water to be treated was put into a container and 100 g of the dyestuff removing preparation (including 87.5 g of charcoal and 12,5 g of bakuhanseki) was added to the dyeing waste water. The dyeing waste water was stirred slowly for about one hour at room temperature. The brown color of the dyeing waste water disappeared completely.

Absorbance of the the treated dyeing waste water was measured after filtering. As shown in Table 2 and FIG. 1, the absorbance in the vicinity of wavelength 470 nm (i.e., concentration of the dyestuffs) was reduced to 0.004.

TABLE 2

Absorbance analysis of dyeing waste water after treatment by the dyestuff removing preparation of Example of the invention

| wavelength nm | absorbance ABS | wavelength nm | absorbance ABS |
|---|---|---|---|
| 900.0 | 0.001 | 550.0 | 0.002 |
| 890.0 | 0.001 | 540.0 | 0.002 |
| 880.0 | 0.002 | 530.0 | 0.003 |
| 870.0 | 0.001 | 520.0 | 0.003 |
| 860.0 | 0.001 | 510.0 | 0.003 |
| 850.0 | 0.001 | 500.0 | 0.003 |
| 840.0 | 0.001 | 490.0 | 0.003 |
| 830.0 | 0.001 | 480.0 | 0.004 |
| 820.0 | 0.002 | 470.0 | 0.004 |
| 810.0 | 0.002 | 460.0 | 0.004 |
| 800.0 | 0.002 | 450.0 | 0.004 |
| 790.0 | 0.001 | 440.0 | 0.004 |
| 780.0 | 0.001 | 430.0 | 0.005 |
| 770.0 | 0.001 | 420.0 | 0.005 |
| 760.0 | 0.001 | 410.0 | 0.006 |
| 750.0 | 0.002 | 400.0 | 0.006 |
| 740.0 | 0.001 | 390.0 | 0.008 |
| 730.0 | 0.001 | 380.0 | 0.009 |
| 720.0 | 0.001 | 370.0 | 0.013 |
| 710.0 | 0.001 | 360.0 | 0.016 |
| 700.0 | 0.001 | 350.0 | 0.020 |
| 690.0 | 0.001 | 340.0 | 0.023 |
| 680.0 | 0.001 | 330.0 | 0.027 |
| 670.0 | 0.001 | 320.0 | 0.031 |
| 660.0 | 0.001 | 310.0 | 0.036 |
| 650.0 | 0.001 | 300.0 | 0.043 |
| 640.0 | 0.001 | 290.0 | 0.054 |
| 630.0 | 0.002 | 280.0 | 0.065 |
| 620.0 | 0.002 | 270.0 | 0.073 |
| 610.0 | 0.002 | 260.0 | 0.081 |
| 600.0 | 0.002 | 250.0 | 0.090 |
| 590.0 | 0.002 | 240.0 | 0.150 |
| 580.0 | 0.002 | 230.0 | 0.274 |
| 570.0 | 0.002 | 220.0 | 0.474 |
| 560.0 | 0.002 | 210.0 | 0.761 |
|  |  | 200.0 | 1.261 |

During this experiment, a majority of bakuhanseki remained deposited on the surface of the wood chips without coming off. As a result of the experiment, it was found that about 98% of the dyestuffs in the dyeing waste water was adsorbed by the dyestuff removing preparation of the example of this invention and removed from the dyeing waste water.

Comparative Example 1

Figure 2:
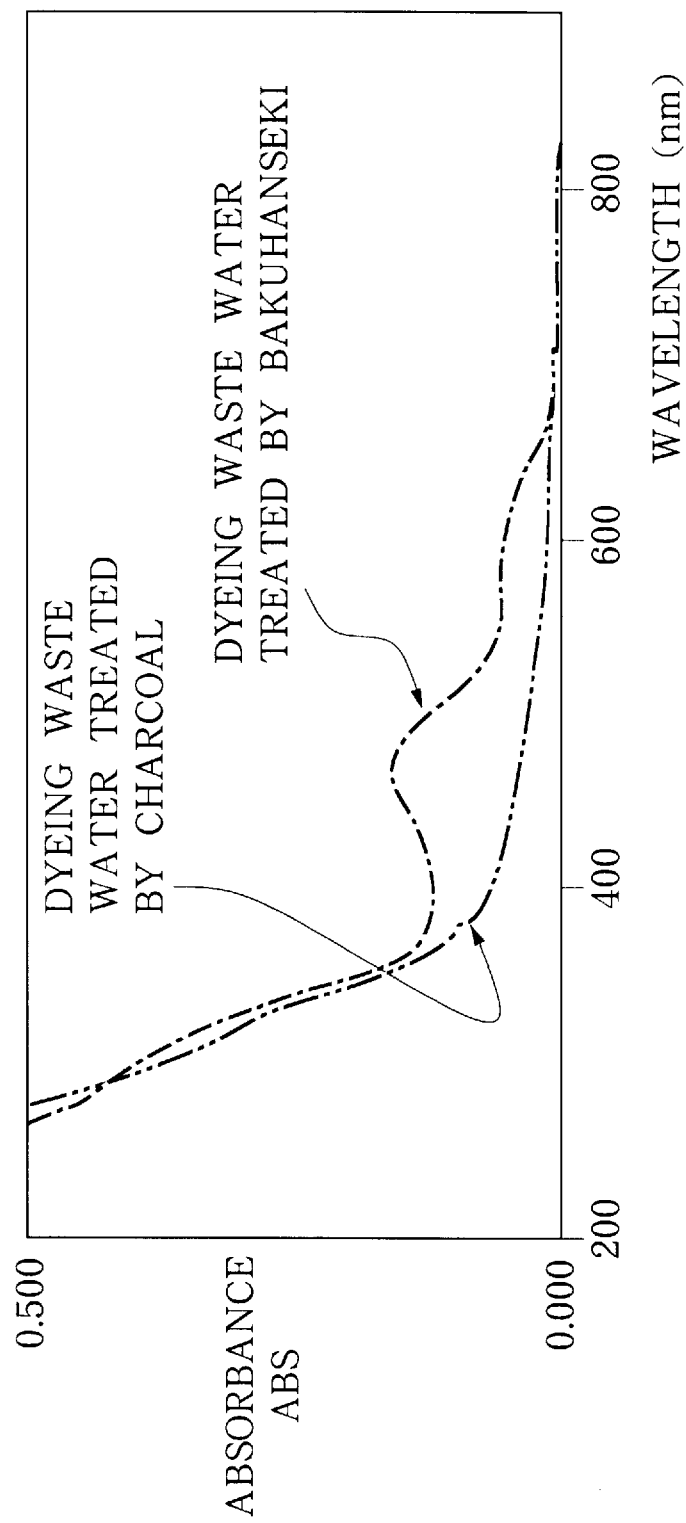
FIG. 2 is a graph showing results of measuring absorbance in the case of treating waste water with charcoal only and in the case of treating waste water with bakuhanseki only.

(1) Wood chips were prepared in the same manner as in the above described Example 1 except that the step of depositing powdery bakuhanseki on the wood chips was omitted. 100 g of the wood chips which do not include the powdery bakuhanseki were added to 500 ml of the same dyeing waste water as the one used in the above example and the dyeing waste water was stirred for about one hour at room temperature. The brown color of the dyeing waste water nearly disappeared. Absorbance of this treated dyeing waste water was measured and it was found that, as shown in Table 3 and FIG. 2, the absorbance of the dyestuffs in the vicinity of wavelength 470 nm was reduced to 0.042. The rate of removal of the dyestuffs was about 77%.

TABLE 3

Absorbance analysis of dyeing waste water after treatment by charcoal

| wavelength nm | absorbance ABS | wavelength nm | absorbance ABS |
|---|---|---|---|
| 900.0 | 0.002 | 550.0 | 0.021 |
| 890.0 | 0.002 | 540.0 | 0.023 |
| 880.0 | 0.003 | 530.0 | 0.025 |
| 870.0 | 0.003 | 520.0 | 0.028 |
| 860.0 | 0.003 | 510.0 | 0.031 |
| 850.0 | 0.003 | 500.0 | 0.033 |
| 840.0 | 0.003 | 490.0 | 0.036 |
| 830.0 | 0.003 | 480.0 | 0.040 |
| 820.0 | 0.003 | 470.0 | 0.042 |
| 810.0 | 0.004 | 460.0 | 0.045 |
| 800.0 | 0.004 | 450.0 | 0.048 |
| 790.0 | 0.004 | 440.0 | 0.051 |
| 780.0 | 0.004 | 430.0 | 0.054 |
| 770.0 | 0.004 | 420.0 | 0.058 |
| 760.0 | 0.004 | 410.0 | 0.063 |
| 750.0 | 0.004 | 400.0 | 0.069 |
| 740.0 | 0.005 | 390.0 | 0.078 |
| 730.0 | 0.005 | 380.0 | 0.094 |
| 720.0 | 0.005 | 370.0 | 0.111 |
| 710.0 | 0.006 | 360.0 | 0.134 |
| 700.0 | 0.006 | 350.0 | 0.171 |
| 690.0 | 0.007 | 340.0 | 0.215 |
| 680.0 | 0.007 | 330.0 | 0.261 |
| 670.0 | 0.007 | 320.0 | 0.299 |
| 660.0 | 0.008 | 310.0 | 0.328 |
| 650.0 | 0.008 | 300.0 | 0.366 |
| 640.0 | 0.009 | 290.0 | 0.408 |
| 630.0 | 0.010 | 280.0 | 0.461 |
| 620.0 | 0.010 | 270.0 | 0.514 |
| 610.0 | 0.012 | 260.0 | 0.573 |
| 600.0 | 0.013 | 250.0 | 0.647 |
| 590.0 | 0.014 | 240.0 | 0.773 |
| 580.0 | 0.016 | 230.0 | 0.950 |
| 570.0 | 0.017 | 220.0 | 1.135 |
| 560.0 | 0.019 | 210.0 | 1.428 |
|  |  | 200.0 | 1.979 |

Comparative Example 2

100 g of the same powdery bakuhanseki as the one used in the above described example was added to 500 ml of the same dyeing waste water as the one used in the above described example and the dyeing waste water was stirred for about one hour at room temperature. The brown color of the treated dyeing waste water remained though it became thin. The absorbance of the treated dyeing waste water was measured and it was found that, as shown in Table 4 and FIG. 2, the absorbance of the dyestuffs in the vicinity of wavelength 470 nm was reduced to 0.161. The rate of removal of the dyestuffs was about 13%.

TABLE 4

Absorbance analysis of dyeing waste water after treatment by bakuhanseki

| wavelength nm | absorbance ABS | wavelength nm | absorbance ABS |
|---|---|---|---|
| 900.0 | 0.002 | 550.0 | 0.060 |
| 890.0 | 0.001 | 540.0 | 0.065 |
| 880.0 | 0.001 | 530.0 | 0.074 |
| 870.0 | 0.002 | 520.0 | 0.090 |
| 860.0 | 0.002 | 510.0 | 0.109 |
| 850.0 | 0.002 | 500.0 | 0.128 |
| 840.0 | 0.002 | 490.0 | 0.145 |
| 830.0 | 0.002 | 480.0 | 0.156 |
| 820.0 | 0.002 | 470.0 | 0.161 |
| 810.0 | 0.002 | 460.0 | 0.158 |
| 800.0 | 0.002 | 450.0 | 0.150 |
| 790.0 | 0.003 | 440.0 | 0.142 |

TABLE 4-continued

Absorbance analysis of dyeing waste water after treatment by bakuhanseki

| wavelength nm | absorbance ABS | wavelength nm | absorbance ABS |
|---|---|---|---|
| 780.0 | 0.003 | 430.0 | 0.135 |
| 770.0 | 0.003 | 420.0 | 0.129 |
| 760.0 | 0.003 | 410.0 | 0.126 |
| 750.0 | 0.003 | 400.0 | 0.126 |
| 740.0 | 0.004 | 390.0 | 0.127 |
| 730.0 | 0.004 | 380.0 | 0.129 |
| 720.0 | 0.005 | 370.0 | 0.135 |
| 710.0 | 0.006 | 360.0 | 0.154 |
| 700.0 | 0.007 | 350.0 | 0.188 |
| 690.0 | 0.008 | 340.0 | 0.241 |
| 680.0 | 0.010 | 330.0 | 0.293 |
| 670.0 | 0.013 | 320.0 | 0.330 |
| 660.0 | 0.018 | 310.0 | 0.361 |
| 650.0 | 0.025 | 300.0 | 0.396 |
| 640.0 | 0.033 | 290.0 | 0.417 |
| 630.0 | 0.040 | 280.0 | 0.441 |
| 620.0 | 0.046 | 270.0 | 0.472 |
| 610.0 | 0.050 | 260.0 | 0.518 |
| 600.0 | 0.053 | 250.0 | 0.566 |
| 590.0 | 0.055 | 240.0 | 0.667 |
| 580.0 | 0.056 | 230.0 | 0.878 |
| 570.0 | 0.056 | 220.0 | 1.063 |
| 560.0 | 0.058 | 210.0 | 1.315 |
|  |  | 200.0 | 1.765 |

Comparison of the results of the absorbance measurement of the example of the invention and the Comparative Examples 1 and 2 shows that, since the amount of reduction in absorbance (i.e., the amount of adsorbed dyestuffs by 100 g of charcoal) in the Comparative Example 1 is 0.142 and the amount of reduction in absorbance (i.e., the amount of adsorbed dyestuffs by 100 g of bakuhanseki) is 0.023, the added amount of reduction in absorbance (i.e., the added amount of dyestuffs adsorbed) by 100 g of charcoal and 100 g of bakuhanseki should be 0.165 (the ratio of removal of dyestuffs is 89.7%. In the example of the present invention, the amount of reduction in absorbance is 0.180 (the ratio of removal of dyestuffs is 98%) notwithstanding that the amounts of charcoal and bakuhanseki used in the experiment were respectively smaller than those used in the Comparative Examples 1 and 2 and, therefore, this amount of reduction in absorbance in the example of the present invention is a value which significantly exceeds the added amount of reduction in absorbance of the Comparative Examples 1 and 2, indicating that the present invention performs a synergistic effect which significantly exceeds an additive effect of the adsorbing effects performed separately by the carbonized carbonaceous material and the powdery or granular bakuhanseki which are constituent elements of the dyestuff removing preparation of the invention.

As described in the foregoing, according to the invention, dyestuffs in dyeing waste water can be removed substantially completely within a relatively short period of time. Therefore, dyestuffs which have been considered difficult to remove completely can be removed in a simple and economic manner so that dyeing waste water can be discharged to a sewage or a river without using a large amount of diluting water. Moreover, dyeing waste water after removing dyestuffs can be used as dyeing water again.

What is claimed is:

1. A preparation for removing dyestuff in dyeing waste water comprising a carbonized carbonaceous material and powdery or granular bakuhanseki deposited on the surface of the carbonized carbonaceous material.

2. A method for removing dyestuff in dyeing waste water by adding the dyestuff removing preparation as defined in claim 1.

* * * * *